United States Patent
Suzuki et al.

(10) Patent No.: US 10,198,169 B2
(45) Date of Patent: Feb. 5, 2019

(54) PARAMETER CONTROLLER, STORAGE MEDIUM AND PARAMETER CONTROLLING METHOD

(71) Applicant: Yamaha Corporation, Hamamatsu-shi, Shizuoka-ken (JP)

(72) Inventors: Masato Suzuki, Hamamatsu (JP); Tomohiro Yamamoto, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 291 days.

(21) Appl. No.: 15/099,386

(22) Filed: Apr. 14, 2016

(65) Prior Publication Data
US 2016/0306536 A1    Oct. 20, 2016

(30) Foreign Application Priority Data

Apr. 14, 2015 (JP) .................................. 2015-082886

(51) Int. Cl.
*G06F 3/0484* (2013.01)
*H04H 60/04* (2008.01)

(52) U.S. Cl.
CPC ...... *G06F 3/04847* (2013.01); *G06F 3/04842* (2013.01); *H04H 60/04* (2013.01)

(58) Field of Classification Search
CPC combination set(s) only.
See application file for complete search history.

(56) References Cited

U.S. PATENT DOCUMENTS

| 8,064,621 | B2 * | 11/2011 | Terada | H04H 60/04 369/3 |
| 8,098,850 | B2 * | 1/2012 | Terada | H04S 7/00 381/119 |
| 8,170,240 | B2 * | 5/2012 | Suzuki | G06F 3/04847 381/119 |
| 8,457,329 | B2 | 6/2013 | Fujita et al. | |

(Continued)

FOREIGN PATENT DOCUMENTS

| CN | 1835070 B | 11/2010 |
| CN | 101917660 A | 12/2010 |

(Continued)

OTHER PUBLICATIONS

Yamaha Corporation. (2013). "Nuage Fader Ncs500-FD, Operation Manual," English translation, 29 pages.

(Continued)

*Primary Examiner* — Hien L Duong
(74) *Attorney, Agent, or Firm* — Morrison & Foerster LLP (57) ABSTRACT

A control object among control objects is assigned to each of a plurality of channel strips each have at least a control and are disposed on a panel according to a predetermined order. A parameter of control object assigned to each channel strip is adjusted in accordance with a manipulation of the control of the channel strip. A display unit is controlled to display parameters of the control objects assigned to a series of channel strips extracted from the channel strips arranged on the panel according to the order, and on accepting a first operation from the user, another series of channel strips are extracted from the channel strips, and the display unit is controlled to display parameters of the control objects assigned to the extracted channel strips.

9 Claims, 6 Drawing Sheets

(56) References Cited

U.S. PATENT DOCUMENTS

| | | | |
|---|---|---|---|
| 9,570,058 B2 | 2/2017 | Umeo | |
| 9,871,604 B2* | 1/2018 | Terada | H04H 60/04 |
| 2006/0060071 A1* | 3/2006 | Kato | H04H 60/04 84/645 |
| 2006/0210098 A1* | 9/2006 | Okabayashi | H04H 60/04 381/119 |
| 2007/0061729 A1* | 3/2007 | Terada | H04H 60/04 715/727 |
| 2007/0223498 A1* | 9/2007 | Nakayama | H04L 12/6418 370/400 |
| 2012/0023406 A1* | 1/2012 | Fujita | H04H 60/04 715/727 |
| 2012/0275626 A1* | 11/2012 | Miura | H04H 60/04 381/119 |

FOREIGN PATENT DOCUMENTS

| | | |
|---|---|---|
| CN | 103959815 A | 7/2014 |
| EP | 2 230 783 A2 | 9/2010 |
| EP | 2 230 783 A3 | 9/2010 |

OTHER PUBLICATIONS

Yamaha Corporation. (2005). "Digital Mixing Console M7CL," Owner's Manual, English translation, 282 pages.

Extended European Search Report dated Aug. 30, 2016, for EP Application No. 16165290.4, eight pages.

Yamaha Corporation. (2013). "Nuage Fader Ncs500-FD, Operation Manual," with English translation, 58 pages. (re-submit with Japanese version).

Yamaha Corporation. (2005). "Digital Mixing Console M7CL," Owner's Manual, with English translation, 564 pages. (re-submit with Japanese version in 7 parts).

Notification of the First Office Action, dated Feb. 2, 2018, for CN Application No. 201610231734.X, with English translation, 17 pages.

* cited by examiner

| BANK | CHANNEL STRIP | | | | | | |
|---|---|---|---|---|---|---|---|
| | 1 | 2 | 3 | ... | 14 | 15 | 16 |
| INPUT #1 | IN1 | IN2 | IN3 | ... | IN14 | IN15 | IN16 |
| INPUT #2 | IN16 | IN17 | IN18 | ... | IN30 | IN31 | IN32 |
| ⋮ | ⋮ | ⋮ | ⋮ | ⋮ | ⋮ | ⋮ | ⋮ |
| INPUT #8 | IN113 | IN114 | IN115 | ... | IN126 | IN127 | IN128 |
| OUTPUT #1 | OUT1 | OUT2 | OUT3 | ... | OUT14 | OUT15 | OUT16 |
| ⋮ | ⋮ | ⋮ | ⋮ | ⋮ | ⋮ | ⋮ | ⋮ |
| OUTPUT #6 | OUT81 | OUT82 | OUT83 | ... | OUT94 | OUT95 | OUT96 |
| USER #1 | IN9 | IN10 | IN11 | ... | IN22 | IN23 | IN24 |
| USER #2 | IN12 | IN43 | IN21 | ... | IN99 | OUT15 | OUT40 |

PARAMETER CONTROLLER, STORAGE MEDIUM AND PARAMETER CONTROLLING METHOD

TECHNICAL FIELD

The invention relates to a parameter controller for controlling values of parameters, a storage medium containing program instructions enabling an apparatus with a computer to function as such a parameter controller, and a parameter controlling method of such a parameter controller.

BACKGROUND ART

It has been conventionally known a technology to enable a user to effectively adjust a lot of parameters by combining controls disposed on an operation panel and a screen displayed on a display unit, in various apparatuses.

For example, NPL1 discloses an apparatus having a lot of channel strips horizontally arranged on a panel. Each channel strip is a long and narrow area in which a plurality of controls are arranged. On far side of the channel strips on the panel, a display unit of a width corresponding to the channel strips is provided, and GUIs (graphical user interfaces) corresponding to the channel strips are displayed on the display unit.

NPL2 discloses an apparatus with a display which corresponds to only a part of channel strips among all channel strips on a panel. GUIs corresponding to the part of channel strips are displayed on the display unit, and no GUIs corresponding to the other channel strips are displayed.

CITATION LIST

Non Patent Literature

{NPL1} "NUAGE FADER Ncs500FD OPERATION MANUAL", [online], 2013, YAMAHA Corporation, [retrieved on Apr. 13, 2015], the Internet <URL: http://www2.yanaha.co.jp/manual/pdf/pa/japan/others/ncs500-fd_ja_om_a1.pdf>

{NPL2} "DIGITAL MIXING CONSOLE M7CL INSTRUCTION MANUAL", [online], 2005, YAMAHA Corporation, [retrieved on Apr. 13, 2015], the Internet <URL: http://www2.yamaha.co.jp/manual/pdf/pa/japan/mixers/m7c1_ja_om_e0.pdf>

SUMMARY OF INVENTION

Technical Problem

However, in NPL1, the GUIs on the display unit always correspond to channels assigned to the channel strips, and if the GUIs are horizontally scrolled, then the channels assigned to the channel strips are also scrolled. Therefore, there is a problem that it is not easy to reach a desired channel by the scrolling when the number of channels is large.

On the other hand, if the GUIs corresponding to only the part of channel strips are displayed as described in NPL2, the cost of the apparatus is reduced, but there is a problem that the user can't precisely control channels assigned to the channel strips whose corresponding GUIs are not displayed on the display unit. If a user wishes to display a GUI corresponding to a desired channel on the display, the user has to change the assignment of channels to the channel strip corresponding to the display.

The problems as stated above may occur regardless of a kind of the object controlled by the channel strip.

An object of the present invention is to solve the problems as stated above and to provide a parameter controller of low cost and good operability.

Solution to Problem

In order to achieve the above-described object, a parameter controller according to the invention is a parameter controller, including: a panel for accepting operations by a user, on which a plurality of channel strips are arranged according to a predetermined order, and each of the channel strips having at least a control; an assigner for assigning one control object among control objects to each of the channel strips, a parameter of the control object assigned to each channel strip being adjusted in accordance with a manipulation of the control of the channel strip by a user; and a display controller for controlling a display unit to display parameters of the control objects assigned to a series of channel strips extracted from the channel strips arranged on the panel according to the order, wherein, on accepting a first operation from the user, the display controller extracts another series of channel strips from the channel strips, and controls the display unit to display parameters of the control objects assigned to the extracted channel strips.

In the above parameter controller, it is conceivable that the plurality of channel strips includes first channel strips and second channel strips, the assigner assigns control objects to the first channel strips in accordance with a second operation by the user, and the assigner statically assigns control objects to the second channel strips, and when the control objects of the first channel strips is changed in accordance with the second operation by the user, the display controller controls the display unit to display the parameters of the control objects assigned to the channel strips after the change.

Further, it is also conceivable that the assigner collectively changes the assignment of the control objects to the first channel strips in accordance with the second operation by the user.

Alternatively, it is also conceivable that the parameter controller further includes a selector for selecting a control object assigned to any channel strip among the channel strips on the panel in accordance with a selection operation by the user, and when the selector selects a control object, the display controller controls the display unit to display parameters of control objects assigned to a series of channel strips including the channel strip to which the selected control object is assigned.

Alternatively, it is also conceivable that the parameter controller further includes: one control; and a second assigner for assigning a parameter of a control object, assigned to any channel strip on the panel, to the one control, and changing a value of the assigned parameter in accordance with an operation on the one control by the user, and when the one control is operated by the user, the display controller controls the display unit to display parameters of control objects assigned to a series of channel strips including the channel strip to which the control object corresponding to the parameter is assigned.

The above configuration can be realized or embodied as an arbitrary style such as a system, a method, a computer program, a storage medium storing a computer program, other than the above device.

Advantageous Effects of Invention

The structure as described above enables to improve operability of assigning operations when parameters displayed on a screen of a display unit are assigned to a control provided outside the display unit, and values of the parameters are changed by an operation of the control.

DESCRIPTION OF EMBODIMENTS

Hereinafter, an embodiment of the invention will be concretely described based on the drawings.

Figure 1:
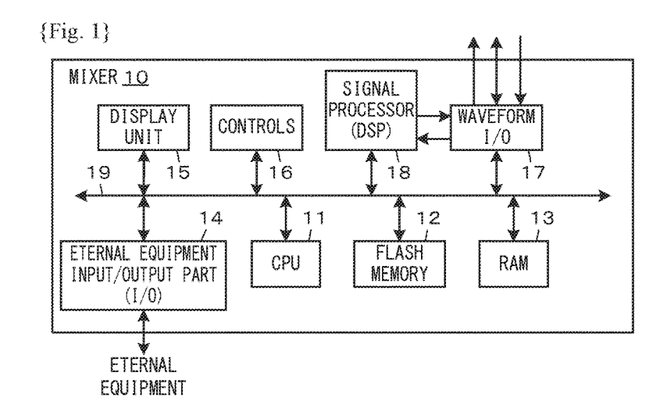
FIG. 1 illustrates a hardware configuration of a digital mixer 10 as an embodiment of a parameter controller of the invention.

FIG. 1 is a block diagram illustrating a configuration of a digital mixer 10 as an embodiment of the parameter controller according to the invention.

As illustrated in FIG. 1, the mixer 10 includes a CPU 11, a flash memory 12, a RAM 13, an external equipment input and output part (I/O) 14, a display unit 15, controls 16, a waveform I/O 17, and a signal processor (DSP) 18, which are connected via a system bus 19. The mixer 10 is an audio signal processing apparatus which has a mixing function for processing audio signals via a plurality of input channels, mixing the audio signals and outputting resultant audio signals via a plurality of output channels.

The CPU 11 is a controller which controls overall operation of the digital mixer 10, and controls hardwares of the mixer by executing control programs stored in the flash memory 12. Various functions such as receiving and outputting of data via the external equipment I/O 14, receiving and outputting of audio signals via the waveform I/O 17, displaying on the display unit 15, detecting user operations on the controls 16, changing values of parameters in accordance with the detected operations are established by the execution of the control programs.

The flash memory 12 is a rewritable nonvolatile storage device storing control programs to be executed by the CPU 11, or the like.

The RAM 13 is a storage device storing various data and used as a work memory of the CPU 11.

The external equipment I/O 14 is an interface to communicate with various external equipment, for example, an external display, mouse, keyboard for character input, portable storage, and so on.

The display unit 15 is a display device which displays various information under the control by the CPU 11, and for example, the display unit 15 includes a liquid crystal panel (LCD) or a light-emitting diode (LED). In this example, the mixer 10 includes an LCD of a size enough to display GUIs for displaying values of parameters and accepting edit operations from the user, as the display unit 15.

The controls 16 accept various operations from the user to control mixer 10, which includes various keys, buttons, rotary encoders, sliders, and so on. The display unit 15 is a touch panel including a touch sensor stacked on the LCD, as one of the controls 16.

The waveform I/O 17 is an interface for receiving audio signals to be processed by the DSP 18, and for outputting the audio signals processed by the DSP 18. The waveform I/O 17 includes: analog input ports which receive analog audio signals from the externals, convert the received signals into digital audio signals, and supply the resultant signals to the DSP 18; analog output ports which convert the digital audio signals from the DSP 18 into analog audio signals and output the resultant signals to the externals; and digital input ports which receive digital audio signals in various transmission formats from the externals and supply the received signals to the DSP 18, and digital output ports which convert the digital audio signals from the DSP 18 into various transmission formats and output the resultant signals to the externals, respectively.

The DSP 18 has functions for performing signal processing including various processing such as mixing and equalizing on the digital audio signals supplied via the waveform I/O 17, and outputting the resultant audio signals via the waveform I/O 17. The signal processing is controlled based on current values (current data) of various parameters stored in the RAM 13 or a memory in the DSP 18. The current data can be edited by a user via an operation of the controls 16.

Figure 2:
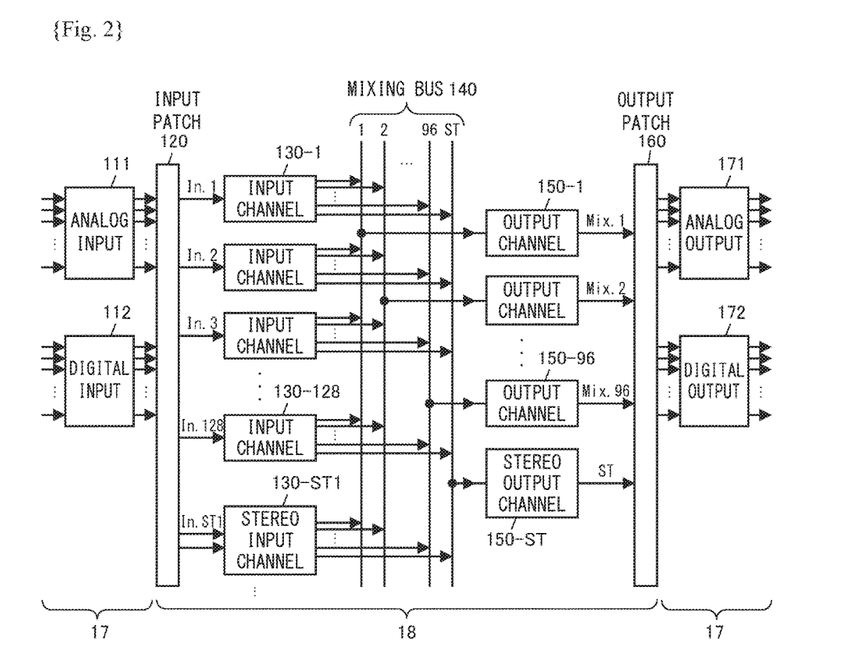
FIG. 2 is illustrates signal processing performed in a DSP illustrated in FIG. 1 in more detail.

Next, a configuration of the signal processing performed in the DSP 18 illustrated in FIG. 1 is illustrated in FIG. 2 in more detail.

As illustrated in FIG. 2, the signal processing executed by the DSP 18 includes various functional blocks such as an input patch 120, input channels 130, mixing buses 140, output channels 150 having one-to-one correspondence with the mixing buses 140, and an output patch 160. Each block may be implemented as software or/and hardware. An analog input 111, a digital input 112, an analog output 171, and a digital output 172 belong to the waveform I/O 17.

In the DSP 18, the input patch 120 patches (connects) any one of the input ports included in the analog input 111 or the digital input 112 to each of the monaural input channels 130 (for example, 128 channels 130-1 to 130-128) and stereo input channels 130-ST (for example, two channels 130-ST1 and not-illustrated 130-ST2).

Each monaural input channel 130 performs various signal processing, such as a dynamics adjustment and a frequency characteristic adjustment in addition to a level adjustment, on the audio signal supplied from the patched input port, and outputs the resultant audio signal to any one or more buses among the mixing buses 140 (for example, 96 monaural buses, and a stereo bus ST). Note that volume level and on/off of an output signal from each channel in the input channels 130 to each bus in the mixing buses 140 can be independently set by the user. In the input channels 130, each of the two stereo input channels 130-ST receives two audio signals from the input patch 120, similarly performs various signal processing on the two audio signals while handling the audio signals as stereo LR signals, and outputs the resultant stereo signals to any one or more buses 140.

Each of the mixing buses 140 mixes any signals inputted from any input channels 130, and provides the monaural or stereo signals after the mixing to the corresponding output channels 150 (namely, 96 channels 150-1 to 150-96 and a stereo output channel 150-ST).

Each output channel 150 performs various signal processing such as the level adjustment, frequency characteristics adjustment on the audio signal inputted from the corresponding mixing bus, and thereafter, outputs the resultant audio signal to one or more output ports patched by the output patch 160.

The output patch 160 patches any one of the output channels 150 to each of output ports included in the analog output 171 and the digital output 172.

Figure 3:
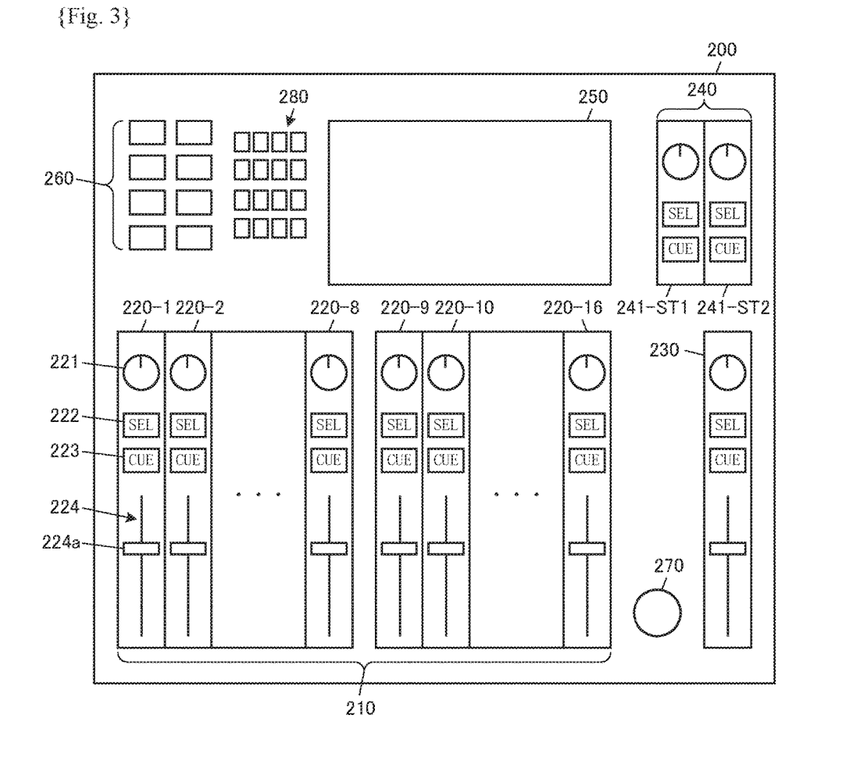
FIG. 3 illustrates a configuration of an operation panel included in the mixer 10.

Next, a schematic configuration of an operation panel included in the digital mixer 10 is illustrated in FIG. 3.

As illustrated in FIG. 3, the digital mixer 10 includes an operation panel 200 on which an assignment channel strip section 210, an ST output channel strip 230, an ST input channel strip section 240, a display unit 250, a bank switch section 260, a rotary encoder 270, and other switches 280 are disposed. Each element 210 to 280 disposed on the panel 200 corresponds to the display unit 15 or/and the controls 16 in FIG. 1.

Among them, the assignment channel strip section 210 includes 16 channel strips 220-1 to 220-16 which are divided into eight strips each.

Each channel strip 220 is a channel strip comprising a plurality of controls disposed in a long and narrow area. The user can change assignment of one channel (the input channel 130 or the output channel 150) as a control object to each channel strip 220, and manipulate each control on the channel strip 220 to adjust a value of a parameter of the assigned channel. Namely, the channel strips 220 are dynamically assigned channel strips. An assignment method is described later.

On each channel strip 220 in FIG. 3, a knob 221, a selection button 222, a cue button 223, and a fader 224 are disposed as the controls.

Among them, the knob 221 is a control, to which any one parameter of the assigned channel is assignable by the user, to accept an adjustment of the value of the assigned parameter from the user.

The selection button 222 is a control to accept a selection operation of a channel assigned to the channel strip from the user. When a detail screen (not-illustrated) of dynamics or frequency characteristics is displayed on the display unit 250 to perform individual detailed adjustments of parameters of the dynamics or frequency characteristics of one channel, the user can operate the selection button of the channel strip to select the assigned channel, then adjust the values of the parameters of the selected channel in the screen.

The cue button 223 is a control to accept a cue command from the user to temporally output a signal of a channel assigned to the channel strip to a monitor output.

The fader 224 is a control to accept an adjustment of a value of a volume parameter of the assigned channel from the user by the user sliding a knob 224a. The fader 224 may be a moving fader with a motor to move the knob 224a to an arbitrary position in accordance with control signals from the CPU 11.

The ST output channel strip 230 is a channel strip, controls of which are to adjust a value of a parameter of the ST output channel 230-ST. Namely, it is a channel strip to which the ST output channel is statically assigned. In this embodiment, a composition of the controls of the ST output channel strip 230 is basically same as that of the channel strip 220 of the assignment channel strip section 210, but they may be different.

The ST input channel strip section 240 includes two channel strips 241-ST1, 241-ST2, each of which includes controls to adjust values of various parameters of a stereo input channel. The stereo input channel receives and processes two-channel signals as stereo signals, using the parameters commonly for the two signals. A composition of the controls in each channel strip 241-ST1, 241-ST2 is basically same as the channel strip 220 of the assignment channel strip section 210 except that a fader is not included. The controls may be different channel strip by channel strip. Each channel strip 241-ST1, 241-ST2 is a channel strip to which a stereo input channel is statically assigned (not changeable by the user).

The display unit 250 is a display device to display various screens (various GUIs). The display unit 250 doesn't have particular correspondence with any of the channel strips.

The bank switch section 260 includes bank switches corresponding to banks to select a bank among the banks. Each bank defines assignment of channels as the control object to channel strips 220 of the assignment channel strip section 210. There are predefined banks prepared in advance and user-definable banks which can be arbitrary edited by the user, described later using FIG. 5.

The rotary encoder 270 is a control, to which the user can arbitrarily assign a parameter of a channel, to accept an adjustment of a value of the assigned parameter from the user. When the user selects a parameter on a detail screen of a processing module of a channel (described later), the CPU 11 assigns the parameter to the encoder 270 in accordance with the selection, and the CPU 11 functions as a second assignor in this assignment. Note that a parameter is assigned to the rotary encoder 270 by the user selecting the parameter from among parameters on the detail screen of a channel (a control object), therefore the channel to which the parameter belongs must be assigned to any of the channel strips on the panel. However, there is a possibility that, by the user assigning other channels to the channel strips later, and thereby, the channel of the parameter assigned to the rotary encoder 270 may not be assigned to any of the channel strips.

The other switches 280 are various controls to accept operations other than ones described above from the user. For example, the operations includes direct assignments of the parameters to the knob 221 or the rotary encoder 270, editing of the user-definable bank, assignment of a control object to the channel strip 220 without using the bank, and so on are included.

Figure 4:
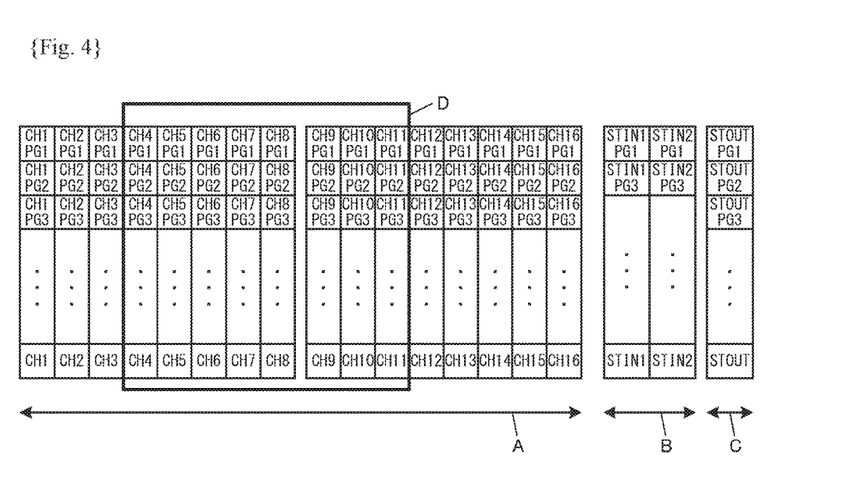
FIG. 4 illustrates a channel overview screen on the display unit.

Next, a channel overview screen to be displayed on the display unit 250 is described by using FIG. 4. A method of displaying and controlling the channel overview screen is one of characteristics in the embodiment.

The channel overview screen described here is a screen for the user to overview information of a plurality of control objects (channels) assigned to a plurality of channel strips (any strips of the channel strips 220, the ST output channel strip 230, the channel strips 241) on the panel 200. But, the screen is not large enough to display the information of all channel strips, therefore a series of channel strips are extracted, as channel strips in a view range, from among all channel strips (a whole range) and the information of the channel strips in the view range are displayed on the screen, and the view range to extract a series of channel strips to be displayed is scrollable on the screen in accordance with a scroll operation by the user.

Here, an arrangement order of the all channel strips on the panel 200 is defined in advance to control displaying order of images of all channel strips on the channel overview screen. The "a series of channel strips" means that these channel strips are continuously arranged on the panel. It is preferable to dispose channel strips on the panel at physical positions corresponding to or at least reflecting the arrangement order.

In FIG. 4, images of the channel strips 220-1 to 220-16 of the assignment channel strip section 210, the channel strips 241-ST1 and 241-ST2 of the ST input channel strip section 240, and the ST output cannel strip 230 are arranged from left to right in the whole range for the screen. As seen in FIG. 4, there may be some difference between the arrangement order for the screen and the disposition of all channel strips from left to right on the panel 200. Although the channel strips are disposed in plural lines (the ST input channel strip section 240 is in a line different from the other channel strips in FIG. 3) on the panel 200, images of the channel strips are arranged in a single line on the screen.

On the channel overview screen in FIG. 4, a vertically long display area is provided for module areas of each channel strip, and information regarding to a control object assigned to the channel strip is displayed in the area.

In FIG. 4, "CHn" (n=1 to 16) in each module area represents a control object (a channel) assigned to the n-th channel strip 220 of the assignment channel strip section 210, "STIN1" and "STIN2" represent the two stereo input channels 130-ST (the control objects assigned to the two channel strips 241), and "STOUT" represents the stereo output channel 150-ST (the control object assigned to the ST output channel strip 230). "PGm" (m=1, 2, 3, . . . ) in each module area represents an m-th parameter group of each control object. The parameter groups of a control object may be corresponded to signal processing modules of the control object, such as an attenuator, a compressor, an equalizer, a fader as a unit, but it is not limited thereto.

For example, information of a first parameter group of a control object (a channel) assigned to the first channel strip in the assignment channel strip section 210 is displayed in a module area described as "CH1PG1". For example, current values of parameters of the parameter group are displayed as a graph or the like showing characteristics of signal processing in a signal processing module corresponding to the parameter group. The values of the respective parameters may be displayed as numerical values in the module area. It is preferable that, when the user operates a module area of a parameter group in a predetermined manner, a GUI (a detail screen) for accepting an adjustment of values of parameters of the parameter group from the user is pop-up displayed on the channel overview screen.

For example, a first touch to a module area of a signal processing module by the user may make a representative parameter of the module assigned to the rotary encoder 270, and a subsequent second touch to the module area may make a detail screen of the module displayed on the display unit. In this case, the value of the parameter assigned to the rotary encoder 270 is certainly displayed on the detail screen. Further, when the user selects another parameter displayed on the detail screen, the selected parameter is assigned to the rotary encoder 270 instead. Note that parameters of a parameter group may be different for each channel as the control object even though the number of the parameter group is the same, and a display format of a signal processing module and processing executed in response to the operation in the predetermined manner are different depending on the difference.

In the lowest module area where only "CHn" is displayed is for displaying the number and the name of the control object.

Note that images indicated by an arrow A in FIG. 4 corresponds to the channel strips 220 of the assignment channel strip section 210. Images indicated by an arrow B corresponds to the channel strips 241 of the ST input channel strip section 240. Images indicated by an arrow C corresponds to the ST output channel strip 230. Because each of two ST input channels have parameter groups different from the other channels, constructions of two channel strips indicated by the arrow B on the screen is different from constructions of the other channel strips.

In this embodiment, images of eight channel strips can be displayed at one time on the display unit 250, and a range D is an example of the view range. The view range can be arbitrary moved around the whole range indicated by the arrows A to C in accordance with the scroll operation by the user. In this embodiment, a position of the view range may be selectable from choices limited in advance such as a first choice from CH1 to CH8, a second choice from CH9 to CH16, a third choice indicated by the arrows B and C, thereby the user can select the position of the view range only from three choices. In this case, the user feels like switching a plurality of pages when the display range is moved.

The operation to move the display range by the user may be, for example, a swipe operation or a drag operation in a left or right direction on the touch panel of the display unit 250.

According to the channel overview screen as stated above, the user can access to GUIs of any of all channel strips on the panel 200 even when a display unit 250 has a width not enough to display all channel strips at a time. Namely, the user can adjust values of parameters of any channel on the panel while accessing to the information of the control object assigned to any channel strip through the GUI, and further, performing an adjustment operation which is impossible on any channel strip on the panel 200 through the GUI. A parameter controller of low cost and good operability is realized.

Because the view range is movable by the user, it is not necessary to make a position and a size of the display unit 250 correspond to the channel strips on the panel 200. Therefore, it is possible to display GUIs on a display unit 250 for all channel strips extending wider than the width of the display on the panel 200. When the user needs GUIs corresponding to control objects on the panel 200, it is possible to reduce user operations to access all GUIs of the control objects. A parameter controller of low cost and good operability is realized.

Figure 5:
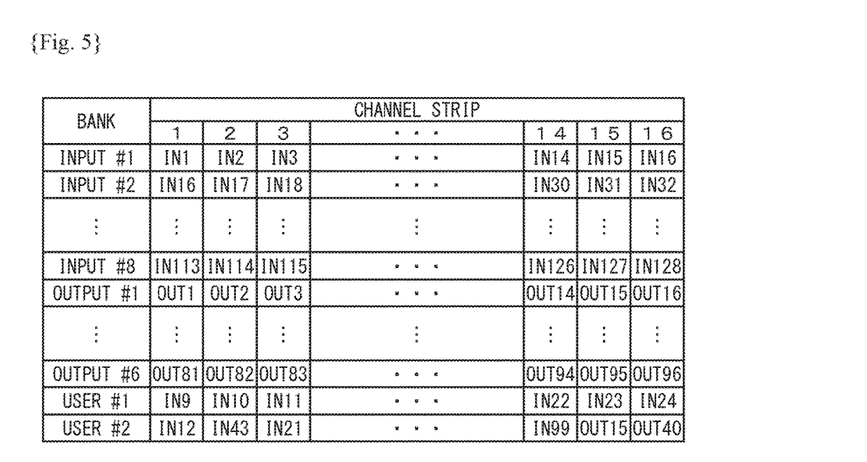
FIG. 5 illustrates an example of a bank table.

Next, the assignment method of the control objects to the channel strips on the panel 200 is described using FIG. 5. FIG. 5 illustrates a bank table used in the assignment.

In the digital mixer 10, the memory 12 stores a plurality of banks, each bank defines a set of control objects (channels) to be assigned to the channel strips 220-1 to 220-16 of the assignment channel strip section 210. When the user selects any one of the banks using the bank switches in the bank switch section 260, the CPU 11 collectively assigns control objects of the selected bank to the channel strips 220-1 to 220-16.

The bank table in FIG. 5 stores eight banks of input #1 to input #8 and six banks of output #1 to output #6 as pre-defined banks prepared in advance, and in addition, stores two banks of user #1 to user #2 editable by the user. Each bank defines channels to be assigned to the channel strips 220-1 to 220-16 one by one.

Each input bank of the banks of input #1 to input #8 defines 16 channels among the 128 input channels 130-1 to 130-128 by every 16 channels in turn. In FIG. 5, "INx" (x=1 to 128) represents an x-th input channel 130-*x*.

Each output bank of the banks of output #1 to output #6 defines 16 channels among the 96 output channels 150-1 to 150-96 by every 16 channels in turn. In FIG. 5, "OUTy" (y=1 to 96) represents a y-th output channel 150-*y*.

Channels of each user bank of the banks of user #1 to user #2 are arbitrarily set by the user. The user doesn't need to set the channels of the user bank in an ascending order from left to right, and the user can set any of the input channels 130 and any of the output channels 150 in an arbitrary mixed manner in one user bank.

Next, among various processes to be executed by the CPU 11 of the mixer 10, some processes relating to functions of the channel strip and display of the channel overview screen (FIG. 4) will be described using FIG. 6 to FIG. 10. The CPU 11 executes programs of these processes in the memory 12.

Figure 6:
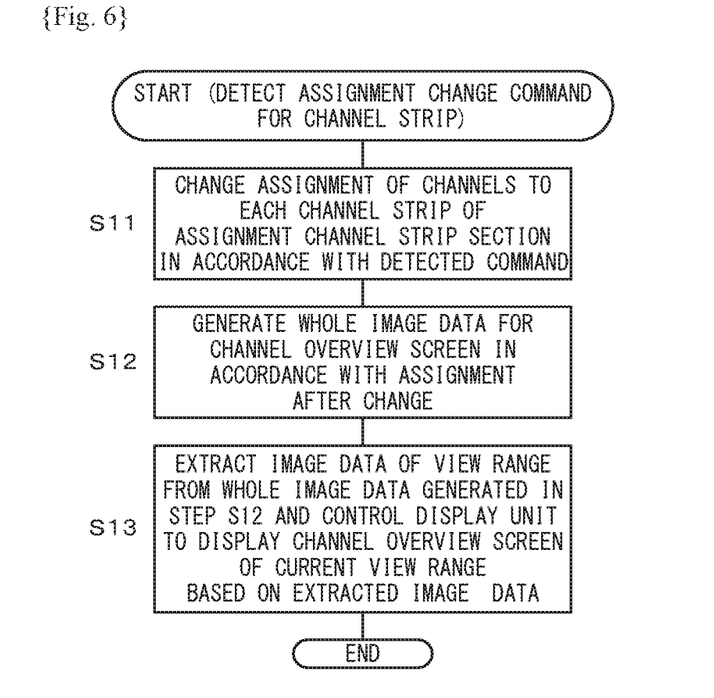
FIG. 6 is a flowchart of a process executed by the CPU of the mixer 10 in response to an assignment change command from the user.

Firstly, FIG. 6 illustrates a process executed when an assignment change command for the channel strip 220 is detected. Note that the assignment change command may instruct an individual assignment of some channels to some of the channel strips 220 without using the bank switches, but usually, the assignment command instructs an assignment of channels to the channel strips 220 with using the bank switches. The operation of the user to perform these commands is a second operation.

The CPU 11 starts the process in FIG. 6 when the assignment change command is detected. Firstly, the CPU changes the assignment by assigning channels (control objects) to channel strips 220 in accordance with the command (S11). Information indicating the assigned channels is stored in the RAM 13.

After that, the CPU 11 generates whole image data for a channel overview screen in accordance with the assignment after the change (S12). The CPU 11 generates the whole image data of a whole range of the channel strips on the panel around which the view range can be moved by the user, the whole range including the display ranges A to C wider than the range D. Since the whole image data is prepared in advance, the CPU 11 can move the view range rapidly around the whole range. When the assignment is changed, CPU 11 may update only a part of the whole image data corresponding to the channel strips of which the assignment is changed at step S11 among the image data so as to reduce a load of the CPU 11.

Next, the CPU 11 extracts image data of the view range from the whole image data generated at step S12 and controls the display unit 250 to display the channel overview screen of the current view range (S13) based on the extracted image data of the view range, and finishes the process. The current view range is a view range displayed on the screen at the timing of the assignment change command, and for example, defined by numbers given to channel strips, such that, from which number of strip to which number of strip in the whole range of channel strips in the arrangement order.

In this case, the CPU 11 functions as an assigner at step S11, and the CPU 11 functions as a display controller at steps S12 and S13.

As seen above, when the assignment of control objects to channel strips 220 is changed, the mixer 10 updates the displayed information of the control objects on the channel overview screen accordingly.

Figure 7:
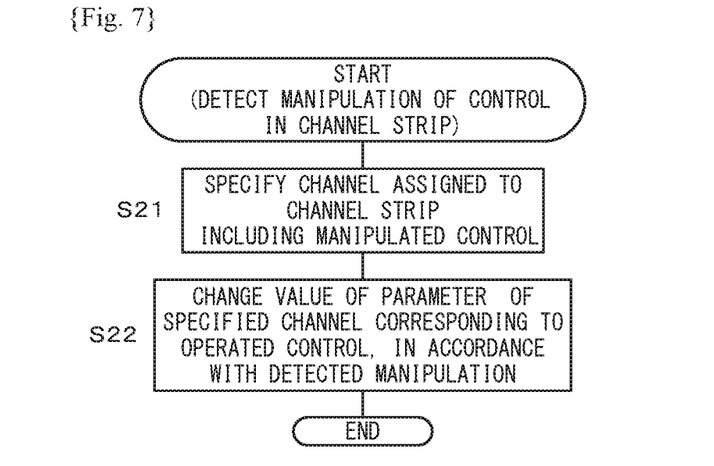
FIG. 7 is a flowchart of a process executed by the CPU in response to an operation of an edit control by the user.

Next, FIG. 7 illustrates a process executed by the CPU 11 when the user manipulates any control (a control to edit a value of a parameter, for example the knob 221, the fader 224 in FIG. 3) in any channel strip 220.

When a manipulation of a control in a channel strip by the user is detected, the CPU 11 specifies a channel assigned to the channel strip (S21), and changes the value of a parameter of the channel, corresponding to the control, in accordance with the detected manipulation (S22). If the value of the parameter is displayed on the display unit 250, the displayed value is also updated accordingly.

As seen above, a value of a parameter of a control object assigned to a channel strip is changed by this process in accordance with a manipulation of a control of the channel strip. This can be applied to both the dynamically assigned channel strip and the statically assigned channel strip. Note that a specifying step of a channel assigned to the channel strip may be performed at any timing, instead of at step S21, before execution of the process in FIG. 7, for example, at a timing of selecting a bank.

Figure 8:
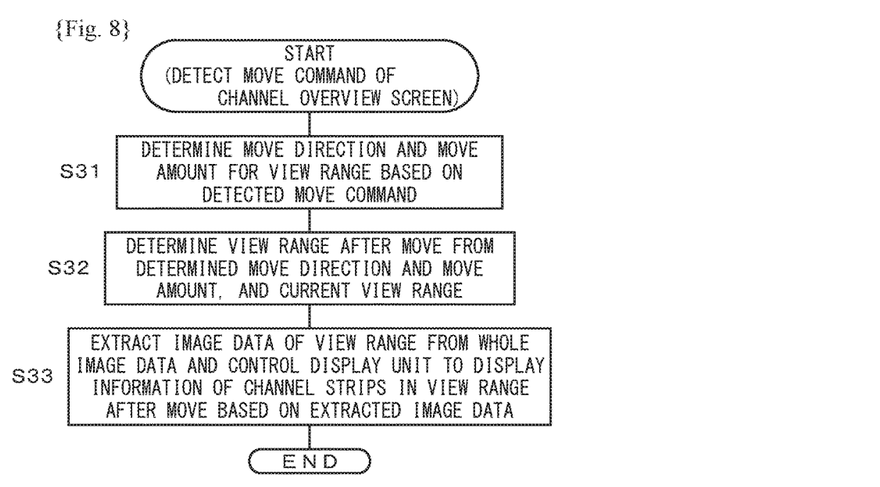
FIG. 8 is a flowchart of a process executed by the CPU in response to a move command form the user.

FIG. 8 illustrates a process executed when a move command for the channel overview screen is detected are illustrated in FIG. 8. The move command may be issued in response to the scroll operation such as a swipe operation or a drag operation on the touch panel on the display unit 250 by the user as stated above, and the operation corresponds to a first operation.

When the move command is detected, the CPU 11 starts the process in FIG. 8. Firstly, the CPU 11 determines a move direction and a move amount for the view range of the screen based on the move command (S31). Next, the CPU 11 moves the view range to a position in accordance with the determined move direction and move amount, and the current view range, and thereby determines the view range after the move (S32). At this step, the CPU 11 may simply shift the view range in the move direction for the move amount, and when it reaches an end position in a movable range (the whole range), the view range after the move is kept at the end position.

Otherwise, when the view range is selectable from the limited choices (for example, the display ranges set by every predetermined number of channel strips), the CPU 11 shifts the view range in the determined direction for the determined amount, selects a choice nearest from the shifted view range as the display range after move. For example, in FIG. 4, the three choices are set by every eight channel strips. A range from CH1 to CH8 is a first choice, a range from CH9 to CH16 is a second choice, and a range including STIN1, STIN2, STOUT and five blanks is a third choice. Here, a blank is a vertically long display area where no control object is displayed.

After that, the CPU 11 extracts image data of the view range from the whole image data and controls the display unit 250 to display information of a series of channel strips in the view range after the move based on the extracted image data (S33), and ends the process. At this step, the CPU 11 changes values of parameters displayed on the channel view screen on the display unit 250 from values of parameters of control objects assigned to a series of channel strips before the move to values of parameters of control objects assigned to a series of channel strips after the move. Here, the values of the parameters included in the current data are displayed. Otherwise, the CPU 11 may continuously scroll the view range from a position before the move to a position after the move in the process.

In this case, the CPU 11 functions as the display controller in the process.

The digital mixer 10 extracts image data of the view range and changes the view range of the channel overview screen in FIG. 4 by the CPU 11 performing the process. Note that the assignment of the control object to the channel strip is not changed in response to the move command.

Figure 9:
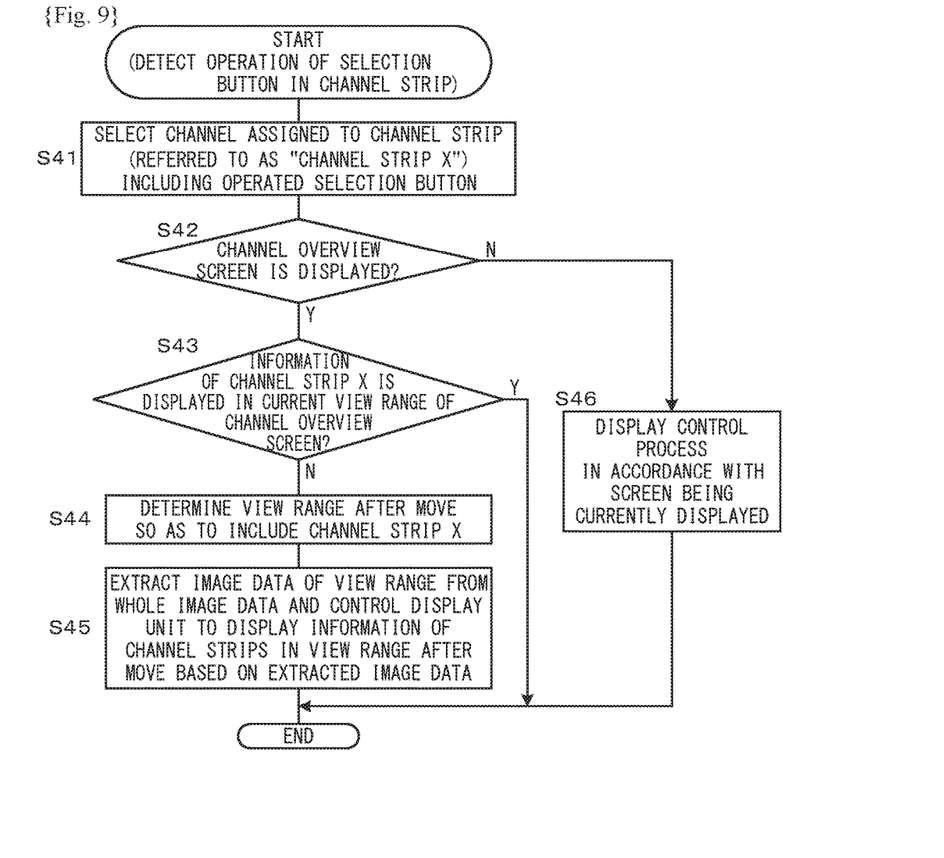
FIG. 9 is a flowchart of a process executed by the CPU in response to an operation of a selection button by the user.

FIG. 9 illustrates a process executed when an operation of a selection button 222 (a selection operation) in a channel strip 220 by the user is detected.

When the operation of the selection button 222 is detected, the CPU 11 starts the process in FIG. 9. Firstly, the CPU 11 selects a channel (a control object) assigned to the channel strip (referred as "channel strip X") including the operated selection button 222 (S41).

Next, the CPU 11 judges whether or not a channel overview screen is displayed on the display unit 250 (S42), and when it is displayed, the CPU 11 proceeds to processes of step S43 to control the channel overview screen.

If information of the channel strip X is not displayed in the current view range of the channel overview screen (No in S43), the CPU 11 moves the view range and determines the view range after the move so as to include the channel strip X (S44), extracts image data of the view range and controls the display unit 250 to display information of a series of channel strips in the view range after the move (S45), and ends the process. The step S45 is basically similar to the step S33, and the CPU 11 changes values of parameters displayed on the channel view screen on the display unit 250 to values of parameters of control objects assigned to a series of channel strips including the selected channel strip X.

At step S44, the view range after the move may be determined by the CPU 11 such that, for example, the channel strip X positions at a center of the view range, or the display range which includes the channel strip X may be selected among the limited choice, namely the view ranges set by every predetermined number of channel strips. Other than the above, the display range after the move may be determined in any position as long as the channel strip X is included in the display range.

When the CPU 11 judges Yes at step S43, there is no need to change the view range, and therefore, the CPU 11 ends the process after step S43.

Further, when the CPU 11 judges No at step S42, the CPU 11 performs a display control process in accordance with a screen being currently displayed (S46), then ends the process. For example, when a detail screen of a signal processing module of a control object is displayed at step S42, the CPU 11 selects a control object newly and controls the display unit 250 to display a detail screen of a signal processing module, of the same type, of the newly selected control object instead at step S46.

In this case, the CPU 11 functions as a selector at step S41, and the CPU 11 functions as the display controller at steps S44 and S45.

As seen above, when the user newly selects any channel while the channel overview screen is displayed, the mixer 10 displays information of the selected channel in the channel overview screen. Maybe the user focuses on the newly selected channel, and therefore, the user can effectively adjust parameters of the channel by displaying information of a channel strip to which the newly selected channel is assigned, on the channel overview screen.

Figure 10:
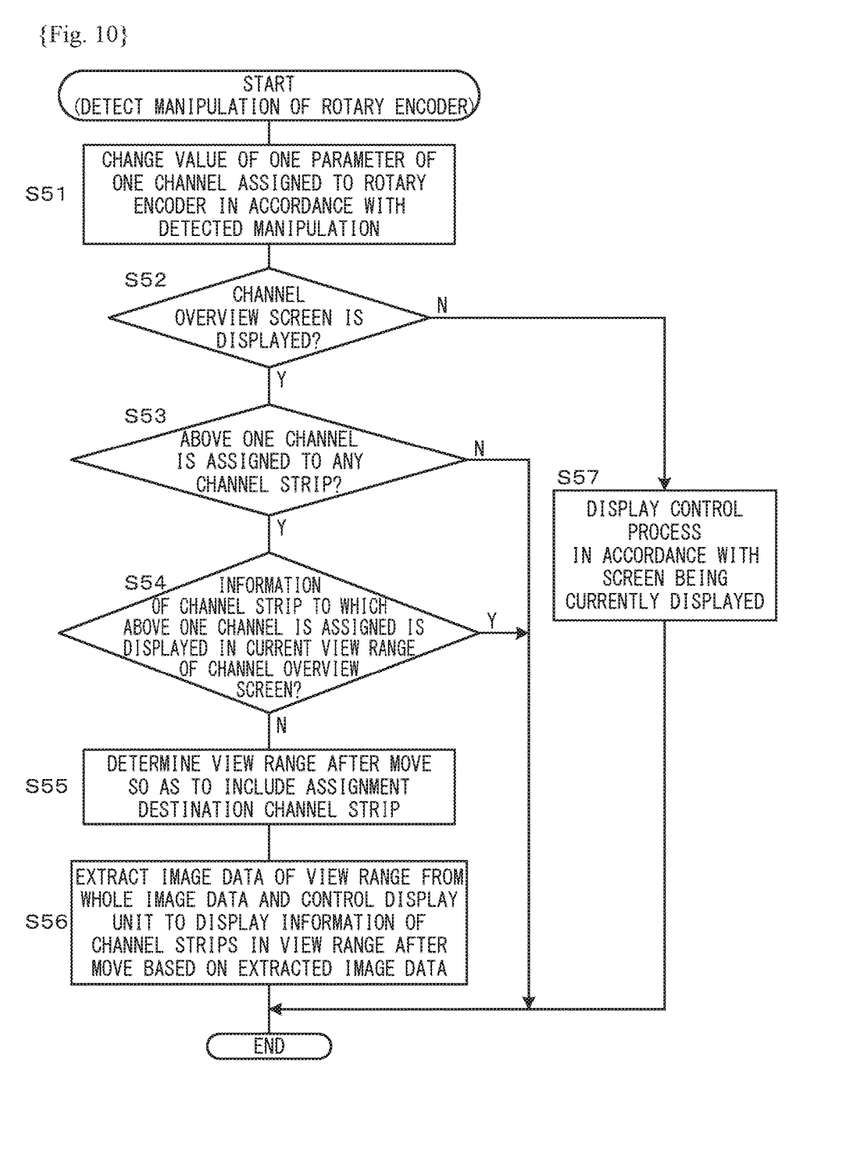
FIG. 10 is a flowchart of a process executed by the CPU in response to an operation of a rotary encoder by the user.

FIG. 10 illustrates a process executed when a manipulation of the rotary encoder 270 by the user is detected.

The CPU 11 starts the process in FIG. 10 when the manipulation of the rotary encoder 270 is detected. Firstly, the CPU 11 changes a value of one parameter of one channel assigned to the rotary encoder 270 in accordance with the detected manipulation (S51). If the value of the one parameter is displayed, the displayed value is changed accordingly.

Next, the CPU 11 judges whether or not a channel overview screen is displayed on the display unit 250 (S52), and when it is displayed, the CPU 11 proceeds to the processes of step S53 and later relating to an update of the channel overview screen.

That is, the CPU 11 judges whether or not the one channel is currently assigned to any channel strip of the channel strips on the panel 200 (S53). The channel strips includes the dynamically assigned channel strips and the statically assigned channel strips. When the CPU 11 judges No, because none of channel overview screens displayable at the moment displays the value of the one parameter changed at step S51, there is no need to change the channel overview screen, and the CPU 11 ends the process after step S53.

On the other hand, when the CPU 11 judges Yes at step S53, the CPU 11 executes steps S54 to S56 similarly to the execution of steps S43 to S45 in FIG. 9 described above, and end the process. Namely, if information of the channel strip to which the one channel assigned is not displayed in the current view range of the channel overview screen, the CPU 11 extracts image data of a view range including the channel strip to which the one channel is assigned and controls the display unit 250 to display the channel overview screen of the view range (S54 to S56).

When the CPU 11 judges No at step S52, the CPU 11 performs a display control process (S57) in accordance with a screen being currently displayed, and ends the process.

In this case, the CPU 11 functions as the display controller at steps S54 to S56.

When the user changes value of one parameter of one channel using the encoder 270, if information of a channel strip to which the one channel is assigned is not displayed on a channel overview screen, the mixer 10 moves the view range to display information of the channel strip on the channel overview screen. Maybe the user focuses on the channel of which one value of one parameter is changed by the user using the encoder 270, and therefore, the user can efficiently adjust parameters of the one channel by displaying information of a channel strip to which the one channel is assigned, on the channel overview screen.

The description of the embodiment has been completed, but needless to say, a configuration of the apparatus, configurations of the panel and the screen, procedures, a configuration and functions of data, and so on are not limited to ones described here.

For example, the move command of the display range on the channel overview screen is not limited to the swipe operation or the drag operation. Any operation is applicable as the move operation, as long as it is an operation capable of instructing the move direction and the move amount of the display range. Particularly, only the move direction may be instructed while fixing the move amount. As concrete examples, a scroll bar is useable for accepting a scroll command from the user. Besides, a cursor switch may be prepared and the display range is moved by one channel strip or by channel strips every time when the cursor switch is operated by the user.

In a case where the display range is selected from limited choices by the user, it is conceivable that, during a drag operation, the display range is moved by one channel strip by one channel strip according to the position of the drag operation, and, when the drag operation is finished, the display range is moved to one of the limited choices which is the nearest from the display range at the moment.

The assignment of the control object may be configured such that the user selects a bank among banks and assigns the bank of control objects to a part of the channel strips 220 of the assignment channel strip section 210. In this case, the bank may define control object corresponding to the section, or the bank corresponding to the channel strips may be limited in a rage corresponding to the section as illustrated in FIG. 5. Otherwise, two or more assignment channel strip sections may be provided on the panel, and the assignment of control objects using the bank switches may be performed individually on each assignment channel strip section. Note that in the embodiment, it is not essential to use the bank switches for the assignment of control objects. The invention of the channel overview screen is applicable to an apparatus configured such that the user assigns a control object to each of the channel strips one by one.

In the embodiment, to display a channel overview screen on the display unit, image data of a whole range of the channel strips is prepared and held by the CPU 11 in FIG. 6 when the assignment of control objects to the channel strips is changed. When the view range of the channel overview screen is moved by the user, the CPU 11 extracts image data of a view range after the move from the whole image data to display the channel overview screen after the move. However, the CPU 11 may generate only image data of a view range required at each moment to display a channel overview screen of the view range on the fly when the view range is moved. For a fixed number of channel strips on the panel, the CPU 11 may prepare only image data of a view range according to a screen size of the display unit at a boot of the mixer 10, and may update only image data of the view range when the channel overview screen is to be displayed.

The channel strips on the panel 200 are disposed along two lines in FIG. 3, but they may be disposed along one line, or three or more lines. Further, the channel strips may be disposed along a curve such as an arc, or along a wave such as a zig-zag, so on. The channel strips may be disposed in different directions depending on positions such that some strips are disposed horizontally, and other strips are disposed vertically. Accordingly, shape of a channel strip, the number of controls in a channel strip, functions, and so on may be different for each channel strip.

In any case, because the arrangement order of channel strips for the channel overview screen is reflected to positions of channel strips on the panel, it is easy for the user to associate each channel strip on the panel with an image of the corresponding channel strip on the channel overview screen. The arrangement order may be changed by the user.

The digital mixer 10 may comprise a plurality of controls of various shape, each having a function similar to the rotary encoder 270, on the panel 200.

In response to an operation on a control, to which one channel is assigned, other than the selection button 222 and the rotary encoder by the user, the CPU 11 may move the view range of the channel overview screen to display information of channel strips including a channel strip to which the one channel is assigned in the same way as the steps S42 to S44 in FIG. 9 or the steps S52 to S55 in FIG. 10. On the other hand, the CPU 11 may not move the view range of the channel overview screen when the selection button 222 or the rotary encoder 270 is operated by the user.

As stated above, the move function of the view range described in FIG. 9 and FIG. 10 is useful for the user, and which control triggers a move of the view range is optional. The CPU 11 may move the view range in response to an operation on any control by the user. The CPU 11 may move the view range in response to only the move operation by the user.

A channel overview screen is not limited to the example of FIG. 4. Gaps between every 8 channel strips, which correspond to positions of channel strips on the panel 200, are not necessary and may be abandoned. The number of channel strips displayed in a channel overview screen is arbitrary. Usually the number is less than the number of channel strips on the panel.

Any computer including a general purpose computer can act as the digital mixer 10 by executing control programs to control a device comprising channel strips disposed in a predetermined order on a panel. The functions of the mixer 10 may be distributed into a plurality of devices, and the plurality of the devices cooperate with one another to function as a system which acts as the mixer 10.

The control programs are stored in the ROM, another nonvolatile storage (for example, flash memory, EEPROM) or the like in the computer. However, the control programs may be stored in any nonvolatile medium such as a memory card, a CD, a DVD, a Blu-ray disc, and so on. The control programs in the medium may be installed in the computer to execute.

Further, the control programs may be downloaded from an external equipment having the recording medium or storing the programs in a storage device via a network, and installed in the computer to execute.

The present invention is applicable to any audio signal processing apparatus, other than the mixer, having a plurality of channels to process audio signals. For example, the invention is applicable to any of an effector, a recorder, an amplifier, a synthesizer, and so on. Further, the invention is applicable to any electronic equipment, other than the audio apparatus, having channels to process signals. The parameter controller may comprise two devices, one device accepts an operation by the user and the other device stores values of parameters of control objects.

The examples and modifications above can be appropriately combined each other to establish the invention as far as the combination is consistent.

INDUSTRIAL APPLICABILITY

As seen above, according to the present invention, it is possible to provide a parameter controller of low cost and good operability.

REFERENCE SIGNS LIST

10 . . . digital mixer, 11 . . . CPU, 12 . . . flash memory, 13 . . . RAM, 14 . . . external equipment I/O, 15 . . . display unit, 16 . . . control, 17 . . . waveform I/O, 18 . . . DSP, 19 . . . system bus, 111 . . . analog input, 112 . . . digital input, 120 . . . input patch, 130 . . . input channel, 140 . . . mixing bus, 150 . . . output channel, 160 . . . output patch, 171 . . . analog output, 172 . . . digital output, 200 . . . panel, 210 . . . assignment channel strip section, 220, 241 . . . channel strip, 221 . . . knob, 222 . . . selection button, 126, 223 . . . cue button, 224 . . . fader, 224a . . . lever, 230 . . . ST output channel strip, 240 . . . ST input channel strip section, 250 . . . display unit, 260 . . . bank switch section, 270 . . . rotary encoder, 280 . . . other switches, D . . . display range

The invention claimed is:

1. A parameter controller, comprising:
an operation panel for accepting operations by a user, on which a plurality of channel strips are arranged according to a predetermined order, and each of the channel strips having at least a control;

an assigner for assigning one control object among control objects to each of the channel strips, a parameter of the control object assigned to each channel strip being adjusted in accordance with a manipulation of the control of the channel strip by a user; and a display controller for controlling a display unit to display parameters of the control objects assigned to a series of channel strips extracted from the channel strips arranged on the panel according to the order, wherein, on accepting a first operation from the user, the display controller extracts another series of channel strips from the channel strips, and controls the display unit to display parameters of the control objects assigned to the extracted channel strips of the another series of channel strips, and wherein the plurality of channel strips includes first channel strips and second channel strips, the assigner changes the assignment of control objects to the first channel strips in accordance with a second operation by the user, and the assigner statically assigns control objects to the second channel strips, and when the control objects of the first channel strips are changed in accordance with the second operation by the user, the display controller controls the display unit to display the parameters of the control objects assigned to the first channel strips and the second channel strips after the change.

2. The parameter controller according to claim 1, wherein the assigner collectively changes the assignment of the control objects to the first channel strips in accordance with the second operation by the user.

3. The parameter controller according to claim 1, further comprising:

a selector for selecting a control object assigned to any channel strip among the channel strips on the panel in accordance with a selection operation by the user, wherein when the selector selects a control object, the display controller controls the display unit to display parameters of control objects assigned to a series of channel strips including the channel strip to which the selected control object is assigned.

4. The parameter controller according to claim 1, further comprising:

one control; and a second assigner for assigning a parameter of a control object, assigned to any channel strip on the panel, to the one control, and changing a value of the assigned parameter in accordance with an operation on the one control by the user, wherein when the one control is operated by the user, the display controller controls the display unit to display parameters of control objects assigned to a series of channel strips including the channel strip to which the control object corresponding to the parameter is assigned.

5. A non-transitory machine-readable storage medium containing program instructions that, when executed by a computer, cause the computer to control a parameter controller to perform a method, the parameter controller being equipped with a plurality of channel strips arranged on a panel according to the predetermined arrangement order, each of the channel strips having at least a control, the method comprising:

assigning one control object among control objects to each of the channel strips;

adjusting a parameter of the control object assigned to each channel strip in accordance with a manipulation of the control of the channel strip by a user; and controlling a display unit to display parameters of the control objects assigned to a series of channel strips extracted from the channel strips arranged on the panel according to the order, wherein the controlling includes, on accepting a first operation from the user, extracting another series of channel strips from the channel strips and controlling the display unit to display parameters of the control objects assigned to the extracted channel strips of the another series of channel strips, and wherein the plurality of channel strips includes first channel strips and second channel strips, the assigning includes changing the assignment of control objects to the first channel strips in accordance with a second operation by the user and statically assigning control objects to the second channel strips, and the controlling further includes, when the control objects of the first channel strips are changed in accordance with the second operation by the user, controlling the display unit to display the parameters of the control objects assigned to the first channel strips and the second channel strips after the change.

6. A parameter controlling method of a parameter controller with an operation panel, on which a plurality of channel strips are arranged according to a predetermined order, and each of the channel strips having at least a control, the method comprising:

assigning one control object among control objects to each of the channel strips;

adjusting a parameter of the control object assigned to each channel strip in accordance with a manipulation of the control of the channel strip by a user; and controlling a display unit to display parameters of the control objects assigned to a series of channel strips extracted from the channel strips arranged on the panel according to the order, wherein the controlling includes, on accepting a first operation from the user, extracting another series of channel strips from the channel strips and controlling the display unit to display parameters of the control objects assigned to the extracted channel strips of the another series of channel strips, and wherein the plurality of channel strips includes first channel strips and second channel strips, the assigning includes changing the assignment of control objects to the first channel strips in accordance with a second operation by the user and statically assigning control objects to the second channel strips, and the controlling further includes, when the control objects of the first channel strips are changed in accordance with the second operation by the user, controlling the display unit to display the parameters of the control objects assigned to the first channel strips and the second channel strips after the change.

7. The parameter controlling method according to claim 6, wherein the assigning of the control objects to the first channel strips includes collectively changing assignment of the control objects to the first channel strips in accordance with the second operation by the user.

8. The parameter controlling method according to claim 6, further comprising:

selecting a control object assigned to any channel strip among the channel strips on the panel in accordance with a selection operation by the user, wherein the controlling further includes, when a control object is selected in the selecting, controlling the display unit to display parameters of control objects assigned to a series of channel strips including the channel strip to which the selected control object is assigned.

9. The parameter controlling method according to claim 6, further comprising:

assigning a parameter of a control object, assigned to any channel strip on the panel, to one control provided in the parameter controller; and changing a value of the assigned parameter in accordance with an operation on the one control by the user, wherein the controlling further includes, when the one control is operated by the user, controlling the display unit to display parameters of control objects assigned to a series of channel strips including the channel strip to which the control object corresponding to the parameter is assigned.

\* \* \* \* \*